(No Model.)
F. M. ASHLEY.
APPARATUS FOR STERILIZING LIQUIDS.
No. 572,515. Patented Dec. 8, 1896.
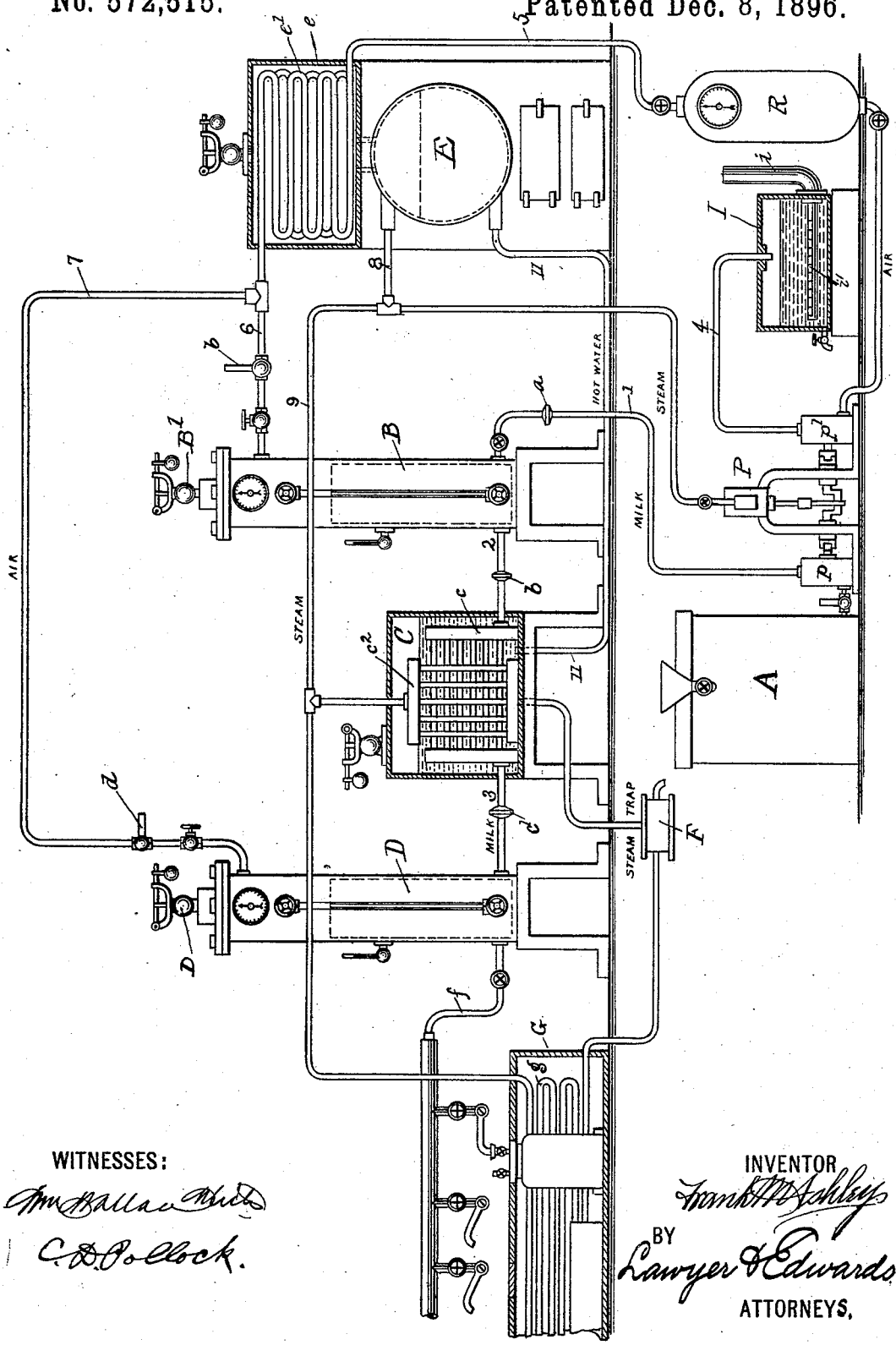
WITNESSES:
INVENTOR
Frank M. Ashley
BY
Lawyer & Edwards
ATTORNEYS.

UNITED STATES PATENT OFFICE.

FRANK M. ASHLEY, OF HAWTHORNE, NEW JERSEY.

APPARATUS FOR STERILIZING LIQUIDS.

SPECIFICATION forming part of Letters Patent No. 572,515, dated December 8, 1896.

Application filed March 19, 1895. Serial No. 542,338. (No model.)

*To all whom it may concern:*

Be it known that I, FRANK M. ASHLEY, a citizen of the United States, and a resident of Hawthorne, in the county of Passaic and State of New Jersey, have invented certain new and useful Improvements in Apparatus for Sterilizing Liquids, of which the following is a specification.

This invention relates to the sterilization of liquids, particularly to the sterilization of milk.

The objects of the invention are substantially the same as those stated in my application, Serial No. 542,337, filed March 19, 1895, the invention described herein being designed as an improvement thereon.

In the accompanying drawing the figure represents a sectional view of my improved apparatus.

A is a receptacle wherein is stored the milk to be sterilized. It is connected by a pipe 1, containing a check-valve $a$, to a tank B, wherein the milk is subjected to a certain amount of pressure, as will be hereinafter described, and tank B is connected by a pipe 2, containing a check-valve $b$, to a series or coil of pipe $c$, located inside of a tank C, the other end of the coil $c$ being connected by a pipe 3, containing a check-valve $c'$, with a tank D, wherein the milk is also subjected to pressure. A pipe $f$ conveys the milk from tank D to a convenient place for storing it in bottles or otherwise disposing of it after it has been sterilized.

I is a closed chamber partly filled with water and having an inlet-tube $i$, through which air may be drawn from the outside atmosphere into the chamber through the water located therein. This chamber contains a layer $i'$, of calcium carbonate or other similar substance, through which the air must pass before it reaches the top of chamber I, from whence it is drawn through pipe 4 into a reservoir R. From reservoir R the air passes through pipe 5 into coil $e'$, thence through pipe 6 into the upper end of the tank B. From coil $e'$ the air also passes through pipe 7 into the upper end of tank D. Pressure-valves $b$ and $d$ are provided in pipes 6 and 7, respectively, and the pressure of the air in tank D is kept lower than that in tank B. Consequently there will be a continual flow of milk from tank B through pipe 2, coil $c$, and pipe 3 into tank B.

E is a steam-boiler, and $e$ a steam-chamber supplied with steam therefrom and surrounding coil $e'$. The air in passing through coil $e'$ is therefore heated to a temperature above 212°, and any germs of disease contained in it are destroyed. There is then no danger that the milk will be injured by coming in contact with impure air. A steam-pipe 8 conveys steam to an engine P, operating two pumps $p$ and $p'$, located, respectively, in pipes 1 and 4 and operating to pump milk from tank A into tank B and to pump air from the atmosphere through tank I into reservoir R. A branch steam-pipe 9 leads the steam through a heater $c^2$, located in coil C, into a steam-trap F. Steam-pipe 9 also leads through a coil $g$, located in chamber G, and thence into steam-trap F. A pipe 11 connects tank C with boiler E and keeps the former filled with hot water to the same level as the water in the boiler. A safety-valve $c^3$ prevents bursting of tank C should the pressure become too great therein.

The operation of the apparatus above described is substantially as follows: Pump $p$ forces the milk from tank A into B, wherein it is subjected to a pressure of hot air from coil $e'$. The air-pressure, supplemented by the force of the pump $p$, forces the milk through pipe 2 into coil $c$. It is there suddenly heated up to the temperature of hot steam from the boiler E and is thoroughly sterilized. It passes out through pipe 3 into tank D. In tank D it is still subjected to the air-pressure; but, the pressure in tank D being lower than that in tank B, there is no tendency on the part of the milk to back into tank B, and even if there were the check-valves $c'$ and $b$ would prevent it. The pressure in tank D forces the milk through pipe F into the receptacle in which it is to be stored. To prevent bursting of tanks B and D by an excess of air-pressure, safety-valves B' and D' are provided.

Having thus described my invention, I claim—

1. The herein-described apparatus for sterilizing milk and the like comprising a receptacle for the milk or other liquid to be sterilized, a series of receptacles for said milk as B D, a heating-chamber arranged between said receptacles B D and connecting with each of said receptacles, means for forcing the liquid to be sterilized from the first containing-receptacle through the two receptacles B D and the heating-chamber, a source of steam supply and connections between the source of steam supply and the heating-chamber, connections between said source of steam supply and a suitable pump for causing circulation of the liquid to be sterilized, a source of hot-air supply also connected to said pump whereby said hot air is forced through suitable conduits, and connections between the source of hot-air supply and each of the receptacles B D.

2. In an apparatus for sterilizing milk or the like, a source of steam supply, a milk-containing receptacle such as B, means for forcing hot air under pressure through said source of steam supply and into said milk-containing receptacle B, a heating-chamber also connected with the source of steam supply and in connection with the chamber B, whereby the milk or other liquid to be sterilized is heated to the proper temperature; substantially as described.

3. In an apparatus for sterilizing milk and the like, a source of liquid supply, a liquid-containing receptacle as B with means for forcing the liquid thereinto, means for supplying air under pressure to said receptacle B and means for heating said air to a high temperature before it enters into contact with the milk, and means for heating said milk while under pressure, above the boiling-point; substantially as described.

4. In the herein-described apparatus, the chambers B D, with means for supplying hot air at varying pressures respectively to said receptacles, a heating-chamber intermediate the two receptacles and connected with each of them, and means for forcing the liquid to be sterilized from a source of supply through the receptacles B D and the heating-chamber; substantially as described.

Signed at New York, in the county of New York and State of New York, this 16th day of March, A. D. 1895.

FRANK M. ASHLEY.

Witnesses:
C. V. EDWARDS,
ABM. KOPEL.